(12) United States Patent
Ping

(10) Patent No.: US 7,516,554 B2
(45) Date of Patent: Apr. 14, 2009

(54) HACK SAW

(75) Inventor: Qiu Jian Ping, Hangzhou (CN)

(73) Assignee: Great Neck Saw Manufacturers, Inc., Mineola, NY (US)

( * ) Notice: Subject to any disclaimer, the term of this patent is extended or adjusted under 35 U.S.C. 154(b) by 0 days.

(21) Appl. No.: 11/649,586

(22) Filed: Jan. 4, 2007

(65) Prior Publication Data

US 2007/0107239 A1      May 17, 2007

Related U.S. Application Data

(63) Continuation of application No. 11/268,892, filed on Nov. 8, 2005, now abandoned.

(51) Int. Cl.
*B23D 51/01*      (2006.01)
(52) U.S. Cl. .................... 30/507; 30/522; 83/699.21
(58) Field of Classification Search ........... 30/507–513, 30/522–524, 517, 342, 337; 83/699.21; 403/322.1, 322.2, 321, 240, 211, 374.1
See application file for complete search history.

(56) References Cited

U.S. PATENT DOCUMENTS

| | | |
|---|---|---|
| 143,650 A | 10/1873 | Weller |
| 156,369 A | 10/1874 | Millspaugh |
| 170,181 A | 11/1875 | Millspaugh |
| 170,970 A | 12/1875 | Tanner |
| 173,319 A | 2/1876 | McChesney |
| 199,845 A | 1/1878 | McChesney |
| 277,141 A | 5/1883 | Learned |
| 316,753 A | 4/1885 | Delafield |
| 552,342 A | 12/1895 | White |
| 601,480 A | 3/1898 | Powell |
| 752,364 A | 2/1904 | Soloman |
| 1,423,506 A | 7/1922 | Slothower |
| 1,972,566 A | 9/1934 | Laemmel |
| 2,017,895 A | 10/1935 | Davey |
| 2,262,540 A | 11/1941 | Stone |
| D162,794 S | 4/1951 | Derr |
| 2,606,584 A * | 8/1952 | Derr ......................... 30/166.3 |
| 2,880,773 A | 4/1959 | Contreras et al. |
| 2,915,096 A * | 12/1959 | Edward ...................... 269/157 |
| 2,996,931 A | 8/1961 | Garafola |
| 3,702,627 A | 11/1972 | Dreier |
| 3,815,648 A * | 6/1974 | Dreier ......................... 30/508 |
| 3,825,047 A | 7/1974 | Mc Manus et al. |
| 4,411,068 A | 10/1983 | Theodorides |
| 4,503,742 A | 3/1985 | Sutton |
| 4,627,165 A | 12/1986 | Gibson |
| 4,648,182 A | 3/1987 | Hoffman |
| 4,827,619 A | 5/1989 | Alm |
| 4,835,869 A | 6/1989 | Waldherr |
| D307,702 S | 5/1990 | Hsu |
| 4,934,034 A | 6/1990 | Fukuda et al. |
| 5,272,948 A | 12/1993 | Theising |
| 5,443,276 A | 8/1995 | Nasser et al. |
| 5,590,473 A | 1/1997 | Wang |
| 5,826,344 A | 10/1998 | Phelon et al. |

(Continued)

*Primary Examiner*—Kenneth E. Peterson
*Assistant Examiner*—Phong Nguyen
(74) *Attorney, Agent, or Firm*—Joseph J. Previto

(57) ABSTRACT

A hack saw having a blade holding assembly and a blade lock assembly. The blade lock assembly having moveable blade lock means adapted to receive a blade therebetween, mechanism for moving the blade lock means to a position to hold a blade in place.

1 Claim, 4 Drawing Sheets

U.S. PATENT DOCUMENTS

| | | |
|---|---|---|
| 5,930,902 A | 8/1999 | Hsu |
| 5,937,527 A | 8/1999 | Okada |
| 6,070,330 A | 6/2000 | Phelon et al. |
| 6,112,420 A | 9/2000 | Schickerling |
| D466,784 S | 12/2002 | Chen |
| 6,711,825 B2 | 3/2004 | Chen |

\* cited by examiner

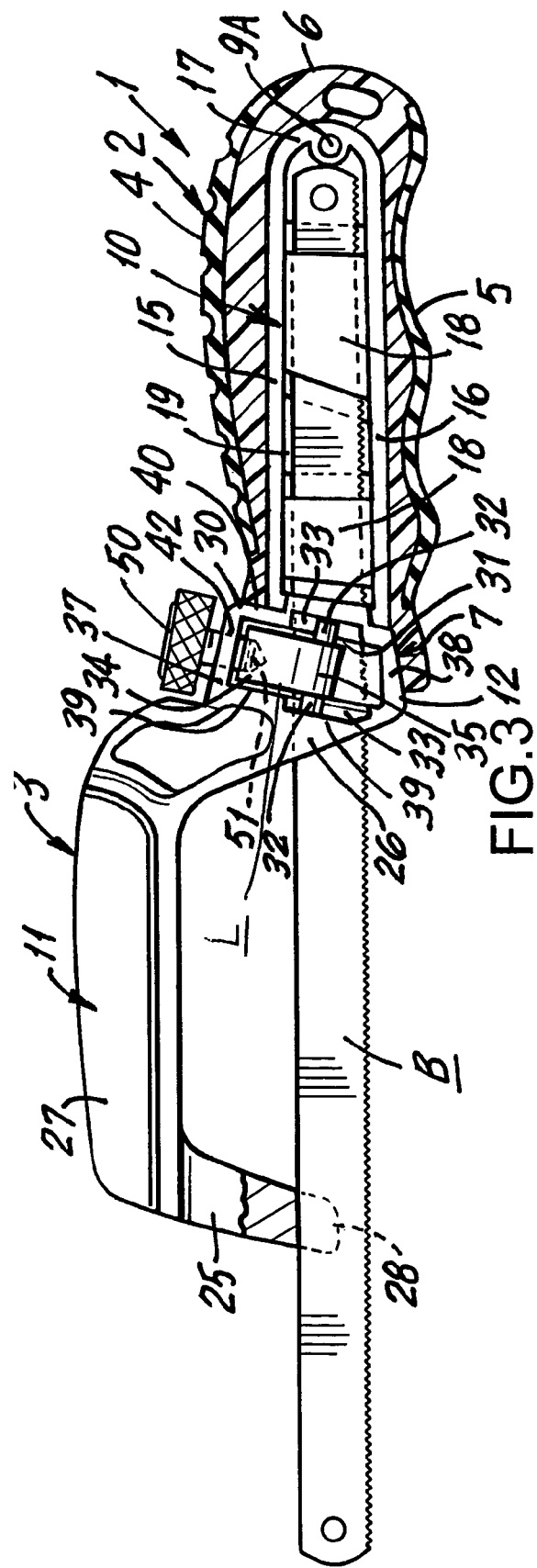

U S 7,516,554 B2

HACK SAW

RELATED APPLICATION

This application is a continuation of U.S. patent application Ser. No. 11/268,892 filed Nov. 8, 2005 now abandoned.

BACKGROUND

The present invention relates to a hack saw and more particularly to close quarter hack saw which has a replaceable blade.

Close quarter hack saws have been known for a number of years. They consist of a frame or handle with a hack saw blade mounted on and extending from the front of the handle. However, some of such close quarter hacksaws may not easily be used or manipulated for effective close quarter work. In other of such close quarter hacksaws the blade may not be easily adjusted relative to the handle and/or may not be easily replaced. Some of such close quarter hack saws are expensive and complicated to manufacture and/or which are difficult to use.

OBJECTS

The present invention overcomes these difficulties and has for one of its objects the provision of an improved close quarter hack saw which may be easily used for close quarter work.

Another object of the present invention is the provision of an improved close quarter hack saw in which the blade may be easily removed.

Another object of the present invention is the provision of an improved close quarter hack saw in which the blade may be easily adjusted relative to the handle.

Another object of the present invention is an improved hack saw which is simple to use.

Another object of the present invention is an improved hack saw which is simple and inexpensive to manufacture and assemble.

Other and further objects of the invention will be obvious upon an understanding of the illustrative embodiment about to described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein:

FIG. 3 is a sectional view taken along lines 3-3 of FIG. 1.

FIG. 4 is a sectional view taken along line 4-4 of FIG. 1.

DESCRIPTION

Figure 1:
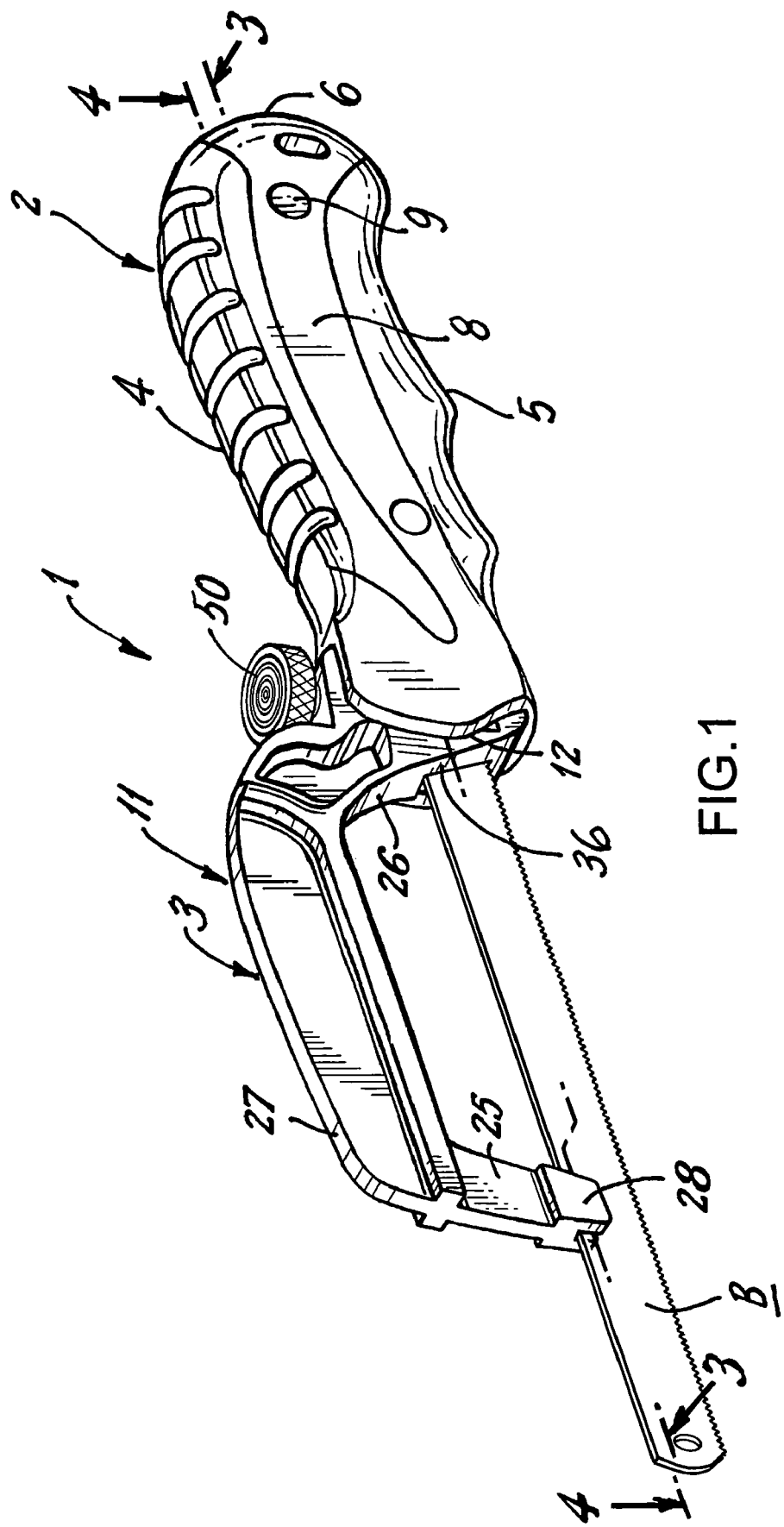
FIG. 1 is a perspective view showing the close quarter hack saw of the present invention.
Figure 2:
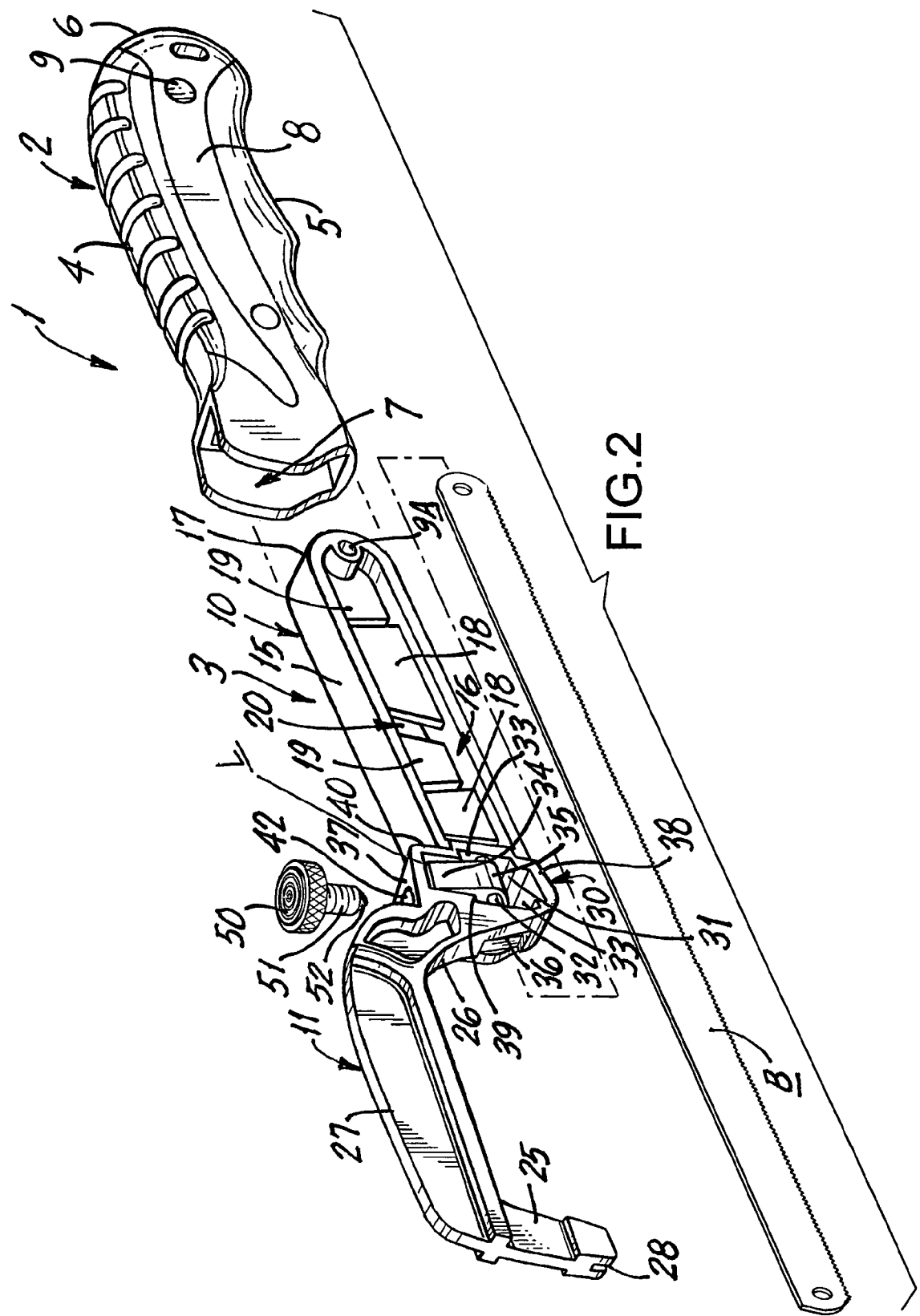
FIG. 2 is an exploded perspective view of the close quarter hack saw of the present invention.

Referring to the drawings, the close quarter hacksaw 1 of the present invention comprises a handle 2 and a frame assembly 3.

The handle 2 has upper, lower and rear walls 4, 5 and 6, respectively, with opposed side walls 8 and an open front 7 adapted to receive at least a portion of the frame assembly 3.

The frame assembly 3 has a rear blade-receiving assembly 10, a front blade-holding assembly 11 and an intermediate blade lock assembly 12 which are preferably made integral (one piece) with each other. The blade-receiving assembly 10 comprises upper, lower and rear walls 15, 16 and 17, respectively, and is insertable in the open front 7 of the handle 2 and held in place by means of any well known fastening means (not shown) extending through openings 9 and 9A in the handle 2 and the blade-receiving assembly 10, respectively. A plurality of staggered (offset) partitions 18 and 19 extend between the upper and lower walls 15-16 of the blade holding assembly 10 on each side of its longitudinal center line to provide a passageway 20 for a blade B.

The front blade-holding assembly 11 comprises and is in the form of a u-shaped blade holder having a front leg 25 and a rear leg 26 connected together by an upper base 27. The front leg 25 has a u-shaped lower notch 28 to receive the front part of a blade B therein. The rear leg 26 is connected to the intermediate blade lock assembly 12. The blade B is slidably mounted within the rear blade-receiving assembly 10 within the passageway 20 formed between the spaced offset partitions 18-19 and is inserted in the notch 28 in the front leg 25.

The blade lock assembly 12 comprises a control compartment 30 formed by front, rear top and bottom walls 37, 38, 39 and 40, respectively. The front wall 39 has a slot 36 therein to receive blade B and the top wall has a threaded opening 42 therein. A blade lock assembly L is provided and comprises a pair of moveable blade lock elements preferably in the form of a pair of opposed cams 31 which are pivotally mounted on pivots 32 located in elongated journals 33 on the front and rear walls 37 and 38 of the compartment 30. Each cam 31 has an upper control finger 34 and a lower lock base 35 from which the pivots 32 extend. The upper control fingers 34 and lower lock bases 35 are on opposite sides of the pivots 32 so that movement of the upper fingers 34 in one direction will move the lower lock bases 35 in the opposed direction and vice versa. The blade B is interposed between the lower lock bases 35. The upper control fingers 34 swing on pivots 32 from a position away from each other to a position toward each other and the lower lock bases 35 swing in the opposite direction. As the cams 31 swing as described above, the pivots 32 slide up and down the journals 33.

Figure 5:
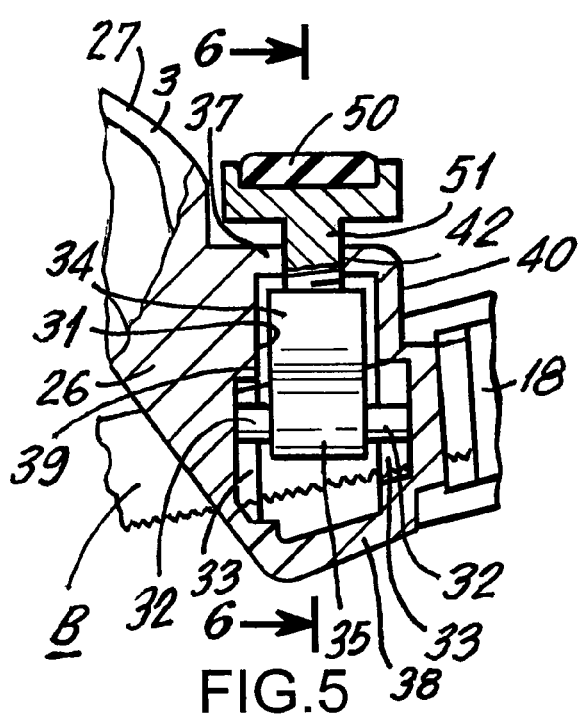
FIG. 5 is a fragmentary side view, partly in section, showing the manner of locking the blade in place.
Figure 7:
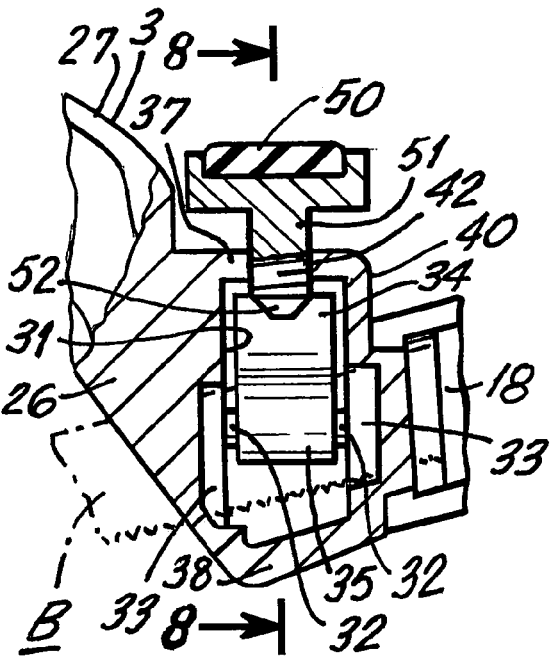
FIG. 7 is a fragmentary side view, partly in section, showing the blade being released from its locked position.
Figure 6:
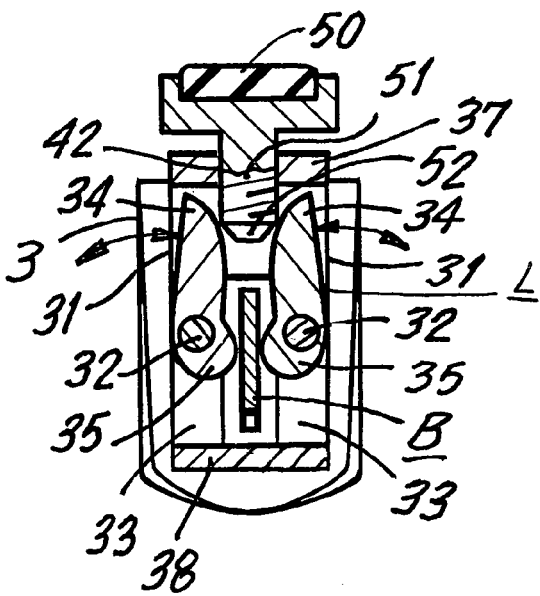
FIG. 6 is a sectional view taken along line 6-6 of FIG. 5.
Figure 8:
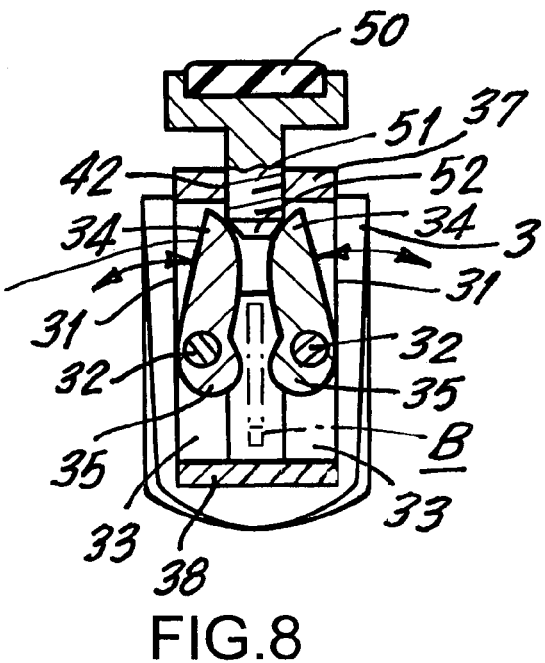
FIG. 8 is a sectional view taken along line 8-8 of FIG. 7.

A controller 50 (in the preferred form of a thumb screw) is threadably mounted by its threaded shaft 51 in the threaded opening 42 at the top of the control compartment 30. The lower end 52 of the threaded shaft 51 extends within the control compartment 30 and is interposed between the upper control fingers 34 of the cams 31 (FIGS. 5-8). When the controller 50 is screwed down and lowered, as shown in FIGS. 5 and 6, its lower end 52 will spread the upper control fingers 34 of the cams 31 apart around pivots 32 thereby allowing the lower lock bases 35 to move toward each other to press and bear against the blade B from both sides to grip and lock the blade B in place. When it is desired to release the blade B, the controller 50 is screwed in the opposite direction to move it upwardly, as shown in FIGS. 7 and 8. Its lower end 52 moves upwardly away from upper control fingers 34 of the cams 31 so that they are now free to move toward each other around the pivots 32 and the lower lock bases 35 are free to move away from each other and the blade B to release their grip on the blade B permit the blade B to be adjusted or removed and replaced.

It will thus be seen that the present invention provides an improved close quarter hack saw which may be easily used for close quarter work in which the blade may be easily removed, in which the blade may be easily adjusted relative to the handle, which is simple to use and which is inexpensive to manufacture and assemble.

As many and varied modifications of the subject matter of this invention will become apparent to those skilled in the art from the detailed description given hereinabove, it will be understood that the present invention is limited only as provided in the claims appended hereto.

The invention claimed is:

1. A hack saw comprising a blade holding assembly and a blade lock assembly, said blade lock assembly comprising spaced moveable blade lock cams adapted to receive a blade therebetween, said blade lock cams being pivotally mounted separately and independently moveable on pivots, a controller for moving said moveable blade holding element lock cams toward each other from a position holding a blade in place to a position away from each other for releasing a blade for movement, each of said blade lock cams comprise a control finger and lock base with said lock bases adapted to receive a blade therebetween, the control fingers and lock bases of said blade lock cams are on opposite sides of said pivots whereby pivoting the control fingers in one direction will pivot the lock bases in the opposite direction, said controller comprises a threaded member threadably mounted on said frame, said blade holding assembly comprises a u-shaped blade holder one leg of which has means to hold a blade, a blade-receiving assembly extends from said blade lock assembly, said blade-receiving assembly extend rearwardly away from the blade lock assembly in a direction opposite to the blade holding assembly, said blade receiving assembly comprises a plurality of offset spaced partitions adapted to receive a blade therebetween, said blade receiving assembly is adapted to be mounted within a handle.

* * * * *